US010293561B2

(12) United States Patent
Buchholz

(10) Patent No.: US 10,293,561 B2
(45) Date of Patent: May 21, 2019

(54) METHOD FOR PRODUCING A CONTAINER FROM THERMOPLASTIC MATERIAL AND PLASTIC CONTAINER PRODUCED ACCORDING TO SAID METHOD

(71) Applicant: KAUTEX TEXTRON GMBH & CO., KG, Bonn (DE)

(72) Inventor: Thomas Buchholz, Bergisch Gladbach (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 235 days.

(21) Appl. No.: 15/106,421

(22) PCT Filed: Dec. 5, 2014

(86) PCT No.: PCT/EP2014/076702
§ 371 (c)(1),
(2) Date: Jun. 20, 2016

(87) PCT Pub. No.: WO2015/096964
PCT Pub. Date: Jul. 2, 2015

(65) Prior Publication Data
US 2017/0001392 A1 Jan. 5, 2017

(30) Foreign Application Priority Data
Dec. 19, 2013 (DE) .................. 10 2013 021 684

(51) Int. Cl.
*B29D 22/00* (2006.01)
*B29C 51/12* (2006.01)
(Continued)

(52) U.S. Cl.
CPC ............ *B29D 22/003* (2013.01); *B29C 49/20* (2013.01); *B29C 51/12* (2013.01); *B29C 65/02* (2013.01);
(Continued)

(58) Field of Classification Search
CPC ... B29D 22/003; B29C 66/114; B29C 66/112; B29C 66/7234; B29C 49/20;
(Continued)

(56) References Cited

U.S. PATENT DOCUMENTS 6,810,569 B1   11/2004   Engle et al.
6,978,802 B2   12/2005   Hagano et al.
(Continued)

FOREIGN PATENT DOCUMENTS

CN      101208188 A      6/2008
WO      2007000454 A1    1/2007
(Continued)

OTHER PUBLICATIONS

English language PCT Search Report dated Mar. 19, 2015, received in corresponding PCT Application No. PCT/EP14/76702, 3 pgs.
(Continued)

*Primary Examiner* — Matthew J Daniels
*Assistant Examiner* — Leith S Shafi
(74) *Attorney, Agent, or Firm* — Grossman, Tucker, Perreault & Pfleger, PLLC

(57) ABSTRACT

The invention relates to a method for producing a tank from thermoplastic material, comprising the following method steps:
extruding or providing a hose-like parison composed of plasticized thermoplastic material, and dividing and spreading the parison into two areal extrudate webs, or extruding or providing two parisons in web form,
laying-in and molding the parisons in recesses of a multi-part blow-molding tool using differential pressure, wherein the recesses of the blow-molding tool delimit a mold cavity,
punching out, or cutting out in a circular shape, at least one opening in at least one shell-like intermediate product, wherein
(Continued)

Figure 2A:
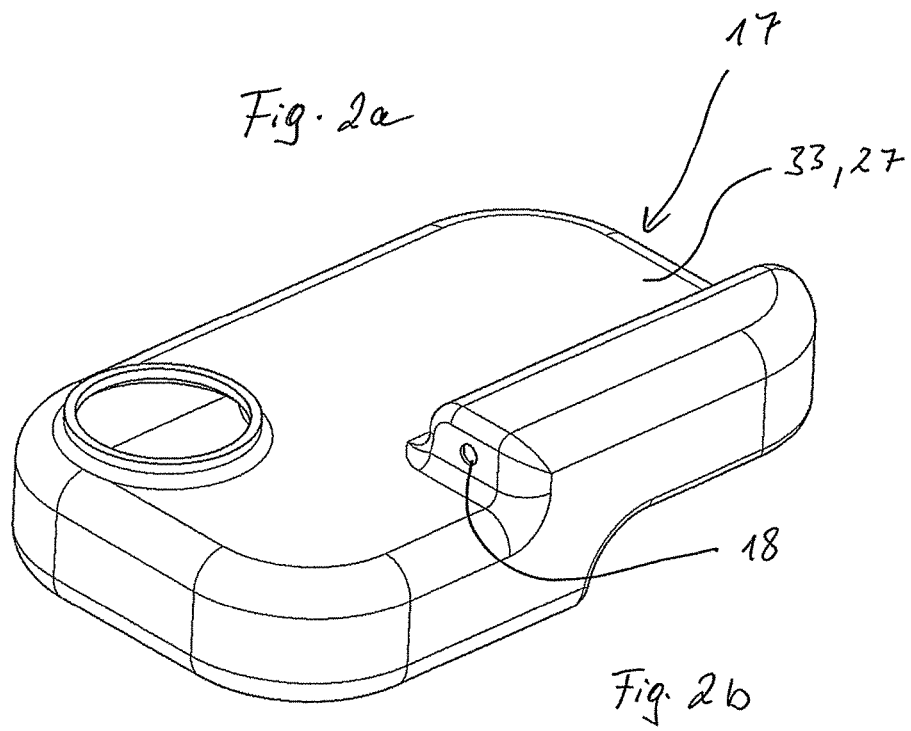

the opening is produced by way of a punching or cutting tool which penetrates through a wall of one of the shell-like intermediate products, wherein in a second separate method step, a first attachment element of a line connection or of a line arrangement is welded, at the mold cavity side, to the wall of the shell-like intermediate product, in such a way that an encircling weld collar of the first attachment element sealingly surrounds the opening, joining the shell-like intermediate products to form a tank, and removing the tank from the blow-molding tool, and connecting a second attachment element, which is complementary to the first attachment element in the context of a plug-type connection, to the first attachment element, wherein the plug-type connection is produced within the contour of the tank as defined by the tank wall.

20 Claims, 7 Drawing Sheets

(51) Int. Cl.
| | |
|---|---|
| B29C 65/00 | (2006.01) |
| B29C 65/02 | (2006.01) |
| B60K 15/03 | (2006.01) |
| B29C 49/20 | (2006.01) |
| B60K 15/035 | (2006.01) |
| B29C 47/00 | (2006.01) |
| B29C 47/06 | (2006.01) |
| B29L 31/00 | (2006.01) |
| B29C 49/22 | (2006.01) |
| B29C 51/10 | (2006.01) |
| B29C 51/14 | (2006.01) |
| B29C 51/26 | (2006.01) |
| B29C 65/14 | (2006.01) |
| B29C 65/20 | (2006.01) |

(52) U.S. Cl.
CPC .......... *B29C 66/112* (2013.01); *B29C 66/114* (2013.01); *B29C 66/5324* (2013.01); *B29C 66/61* (2013.01); *B29C 66/7234* (2013.01); *B60K 15/03177* (2013.01); *B29C 47/0019* (2013.01); *B29C 47/0023* (2013.01); *B29C 47/0054* (2013.01); *B29C 47/061* (2013.01); *B29C 47/065* (2013.01); *B29C 49/22* (2013.01); *B29C 51/105* (2013.01); *B29C 51/14* (2013.01); *B29C 51/262* (2013.01); *B29C 51/267* (2013.01); *B29C 65/1412* (2013.01); *B29C 65/20* (2013.01); *B29C 66/24221* (2013.01); *B29C 66/71* (2013.01); *B29C 2049/2008* (2013.01); *B29C 2049/2047* (2013.01); *B29C 2049/2078* (2013.01); *B29C 2791/006* (2013.01); *B29C 2791/007* (2013.01); *B29C 2793/009* (2013.01); *B29C 2793/0018* (2013.01); *B29K 2995/0067* (2013.01); *B29K 2995/0069* (2013.01); *B29L 2031/7172* (2013.01); *B60K 2015/03032* (2013.01); *B60K 2015/0346* (2013.01); *B60K 2015/03528* (2013.01)

(58) Field of Classification Search
CPC ..... B29C 65/02; B29C 66/5324; B29C 66/61; B29C 51/12; B29C 66/24221; B29C 66/71; B29C 65/20; B29C 65/1412; B29C 2049/2047; B29C 51/262; B29C 47/0023; B29C 2793/0018; B29C 47/065; B29C 47/0019; B29C 47/061; B29C 2793/009; B29C 49/22; B29C 2049/2008; B29C 51/267; B29C 2049/2078; B29C 51/105; B29C 2791/006; B29C 47/0054; B29C 51/14; B60K 15/03177; B60K 2015/03032; B60K 2015/0346; B60K 2015/03528; B29K 2995/0067; B29K 2995/0069; B29K 2023/065; B29L 2031/7172

See application file for complete search history.

(56) References Cited

U.S. PATENT DOCUMENTS

| | | | |
|---|---|---|---|
| 8,276,778 B2 | 10/2012 | Eulitz et al. | |
| 8,590,132 B2* | 11/2013 | Eulitz | B29C 51/12 |
| | | | 264/545 |
| 8,658,079 B2* | 2/2014 | Criel | B29C 49/20 |
| | | | 264/526 |
| 9,555,581 B2 | 1/2017 | Elsasser et al. | |
| 2004/0200846 A1 | 10/2004 | Miyajima et al. | |
| 2007/0290414 A1* | 12/2007 | Criel | B29C 49/20 |
| | | | 264/531 |
| 2011/0221104 A1* | 9/2011 | Criel | B29C 49/20 |
| | | | 264/526 |

FOREIGN PATENT DOCUMENTS

| | | |
|---|---|---|
| WO | 2007122168 A1 | 11/2007 |
| WO | 2008145246 A1 | 12/2008 |
| WO | 2009000362 A1 | 12/2008 |

OTHER PUBLICATIONS

English language Translation of PCT International Preliminary Report on Patentability/WO dated Apr. 28, 2016, received in corresponding PCT Application No. PCT/EP14/76702, 10 pgs.

* cited by examiner

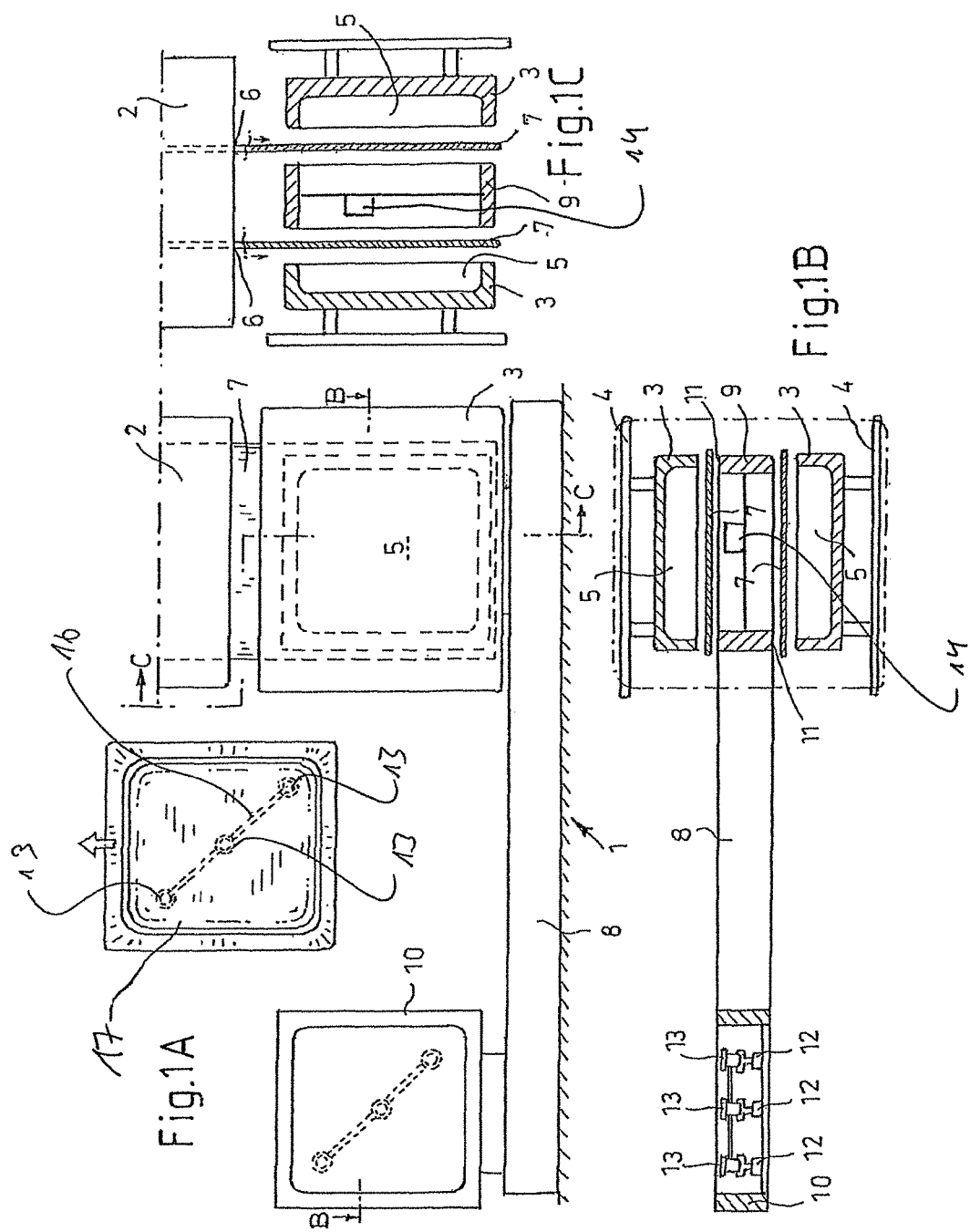

METHOD FOR PRODUCING A CONTAINER FROM THERMOPLASTIC MATERIAL AND PLASTIC CONTAINER PRODUCED ACCORDING TO SAID METHOD

The invention relates to a method for producing a tank from thermoplastic material, which method comprises the extrusion blow molding of the tank and the production of a line connection through a tank wall of the tank.

The invention relates in particular to a method for producing a fuel tank for motor vehicles from thermoplastic material, and to a fuel tank produced in accordance with the method, wherein the fuel tank has ventilation devices arranged in the interior of the tank. Such ventilation devices normally comprise ventilation valves, which are arranged in the so-called expansion volume of the fuel tank, that is to say close to the top when said fuel tank is in an installed position. Said ventilation valves are fastened to the tank wall from the inside and are connected to one another via a spider of lines. The ventilation line is normally led through the tank wall at at least one location of the tank and attached to a fuel vapor filter arranged outside the fuel tank.

As already mentioned above, motor vehicle fuel tanks or other large-volume tanks composed of thermoplastic material are, for the most part, produced integrally by extrusion blow molding or by the welding of injection-molded half-cells composed of thermoplastic material. Normally, said tanks comprise insert components such as for example fuel pumps, fill level sensors, ventilation valves or bubble sections or the like. One known production method for producing such plastics tanks with insert components in one working step comprises the production and/or provision of extrudates in web form, which extrudates are, in a multi-part molding tool, deformed in a first step to form a shell-like intermediate product and deformed in a second step, in the same molding tool, to form a unipartite, closed tank. Here, between two molding tools which define a mold cavity, there is arranged an intermediate frame, within which, or on which, there are arranged components which are to be joined into the shell-like intermediate products. The components are in this case inserted into the intermediate product, which is still in the warm plastic state and has already been deformed to form a shell, and are connected in positively locking and/or cohesive fashion thereto. Here, line leadthroughs are normally also produced.

Here, the approach until now has been for the wall of the shell-like intermediate product to be pierced through by a nipple or attachment fitting from the inside, that is to say from the mold cavity side, during the production process, wherein the nipple has, for example by way of an encircling welding collar, been welded to the inner wall of the shell-like intermediate product, which later forms the tank inner wall.

A method of said type is known for example from DE 10 2007 024 667 A. Said method comprises the production of a tank from thermoplastic material by extrusion blow molding, wherein the tank, during the molding thereof within a multi-part tool, is equipped with at least one attachment element which extends through the wall thereof, wherein the wall of the tank is pierced through, in the still-plasticized state, by a part of the attachment element in such a way that the attachment element, at least in sub-regions, enters into a cohesive connection with the tank wall, wherein the attachment element is equipped with a piercing tip and the attachment element, as it pierces through the tank wall, is pushed into a die provided in the tool, which die is arranged on that side of the tank wall which is averted from the attachment element. In this method, the attachment element is pierced through the tank wall or through the parison from the mold cavity side. Said attachment element serves for making it possible for insert components arranged on the inside of the finished tank, in particular ventilation devices or the like, to be attached to the outside by way of hoses. Thus, after the removal of the piercing tip arranged on the attachment element, a hose is then crimped or squeezed from the outside onto the thus exposed attachment nipple.

The piercing of the wall of the parison during the production of the tank offers the crucial advantage that it is not necessary for the tank wall to be cut out in a circular shape, or drilled, after the production of the tank. In particular, fuel tanks composed of thermoplastic material are produced from multi-layer co-extrudates with barrier layers for hydrocarbons. The subsequent damaging of the barrier layers as a result of production of apertures in the tank wall is basically undesirable, because in said regions, the barrier action of the barrier layers that have a diffusion-inhibiting effect with respect to hydrocarbons is impaired.

A disadvantage of the method discussed above however consists in that the piercing tip must be provided in the form of a single-use sleeve which must be removed after the removal of the tank from the molding tool. This is relatively cumbersome, but the sleeve is necessary in order to prevent damage to the valve system attached, in the interior of the tank, to the attachment element.

A further disadvantage of said method is to be seen in the fact that, for the piercing of the wall of the intermediate product and the welding in a single method step, a relatively large punching device must be provided, which must furthermore also impart a relatively large stroke. With the use of known extrusion blow molding units, the structural space available on the mold cavity side for devices for fastening insert components to the mold-cavity-side wall of the intermediate product is relatively restricted. Furthermore, adherence to a relatively narrow tolerance window is necessary with regard to the arrangement of the punching unit relative to the die provided in the tool.

Finally, the piercing of the wall of the intermediate product requires, in any case, a relatively large stroke of the punching unit. In particular if a line of a spider of lines with ventilation valves is already attached to the attachment element, the stroke must be compensated by the line itself, because such a spider of lines is welded to the various ventilation points of the subsequent tank via ventilation valves in the same working step. This problem is described for example in DE 10 2008 027 823.

Said document describes a method for the production of a fuel tank for motor vehicles from thermoplastic material, which method comprises the production of parisons in web form, the deformation of the parisons, at the first hot temperature in a multi-part tool, in a first step to form shell-like intermediate products and in a second step, in the same tool, to form a unipartite closed tank, wherein at least one tank filling and/or operational ventilation device is fastened to at least one inner wall of the intermediate product between the first and the second step, in such a way that at least one pre-installed part of the tank filling and/or operational ventilation device, with at least one attachment fitting, at least one ventilation line and at least one functional component, is connected cohesively to the inner wall in one working step, wherein the wall of the intermediate product is pierced by the attachment fitting during the installation. To be able to realize the stroke required for this purpose, DE 10 2008 027 823 proposes the use of at least one variable-length line section as a part of the ventilation line, wherein the variability of the length of the ventilation line is selected so as to correspond approximately to the distance covered by the attachment fitting during the piercing of the wall of the intermediate product. This is disadvantageous because, in fact, a correspondingly formed ventilation line with excess length is not desired, because the line may under some circumstances form a siphon in which liquid hydrocarbons collect. Also, the sagging of the line into the volume of the finished tank is undesirable, such that the solution described in DE 10 2008 027 823 A is likewise relatively cumbersome.

Finally, the position of the one or more attachment points on the outer circumference of the finished tank is, under some circumstances, unfavorable, because attachment nipples or the like naturally form a protrusion beyond the shell contour of the tank. WO 2007/000454 A1 has disclosed a method for producing a tank from thermoplastic material, wherein the method comprises extruding or providing a hose-like parison composed of plasticized thermoplastic material, and dividing and spreading the parison into two areal extrudate webs, or extruding or providing two parisons in web form, laying-in and molding the parisons in recesses of a multi-part blow-molding tool using differential pressure, wherein the recesses of the blow-molding tool delimit a mold cavity, and producing at least one opening in at least one shell-like intermediate product, wherein, in one method step, a first attachment element of a line connection or of a line arrangement is welded, at the mold cavity side, to the wall of the shell-like intermediate product, in such a way that an encircling weld collar of the attachment element sealingly surrounds the opening.

The wall of the intermediate product is pierced by a needle while the parison is charged with pressure within the tool. In this case, the piercing of the wall by the needle yields an outwardly protruding material projection which must be removed after the manufacture of the tank.

The invention is therefore based on the problem of providing a method for producing a tank which is composed of thermoplastic material and which has a line leadthrough through the wall thereof, which method substantially avoids the disadvantages mentioned above.

The invention is furthermore based on the object of providing a corresponding tank.

The object on which the invention is based is achieved by way of the features of claims 1 and 8. Advantageous refinements of the invention emerge from the subclaims.

A method for producing a tank from thermoplastic material according to the invention may comprise the following method steps:
  extruding or providing a hose-like parison composed of plasticized thermoplastic material, and dividing and spreading the parison into two areal extrudate webs, or extruding or providing two parisons in web form,
  laying-in and molding the parisons in recesses of a multi-part blow-molding tool using differential pressure, wherein the recess is of the blow-molding tool delimit a mold cavity,
  punching out, or cutting out in a circular shape, at least one opening in at least one shell-like intermediate product, wherein
    the opening is produced by way of a punching or cutting tool, wherein in a further method step, a first attachment element of a line connection or of a line arrangement is welded, at the mold cavity side, to the wall of the shell-like intermediate product, in such a way that an encircling weld collar of the first attachment element sealingly surrounds the opening,
  joining the shell-like intermediate products to form a tank, and removing the tank from the blow-molding tool, and
  connecting a second attachment element, which is complementary to the first attachment element in the context of a plug-type connection, to the first attachment element, wherein the plug-type connection is produced within the contour of the tank as defined by the tank wall.

The invention can be summarized by stating that, according to the invention, the opening of the tank wall, and the opening of the wall of the shell-like intermediate product and the joining of the attachment element, are performed in two separate method steps, wherein the attachment element is fastened to the wall of the intermediate product at the mold cavity side, in such a way that the attachment element does not pierce or extend through the tank wall or through the wall of the intermediate product, and consequently also does not protrude to the outside.

In the context of the present invention, the expression "at the mold cavity side" refers to that side of the extrudate or of the tank wall or of the shell-like intermediate product which faces toward the inner side of the mold cavity. In the context of the present invention, the expression "at the tool side" refers to that side of the parison, of the shell-like intermediate product or of the tank wall which faces toward the shape-imparting side of the blow-molding tool and which is possibly in engagement with the shape-imparting wall of the blow-molding tool.

Laying-in and molding using differential pressure is to be understood generally, in the context of the present invention, to mean an evacuation of the respective recesses and/or molding of the parisons by way of gas pressure (inflation). Laying-in and molding of the parisons using differential pressure may however also, in the context of the present invention, be understood to mean the laying-in and molding of the parisons by way of one or more punches or other positive tools.

The attachment element is thus arranged entirely in the interior of the finished tank, specifically preferably such that the plug-type connection of the line leadthrough merges substantially into the tank contour or envelope of the tank.

A tank produced in this way is thus equipped with an attachment element in such a way that said attachment element does not protrude beyond the envelope of the tank as defined by the tank wall of the tank. On the one hand, this has the advantage that, for example, it is also possible for angle pieces or bends to be provided, as second attachment element, from the outside without significant loss of structural space.

On the other hand, the stroke required for the joining of the first attachment element is minimal; the required extent of stroke is merely that generated by the melting of a welding collar preferably provided on the first attachment element.

Provision may basically be made for the opening to be produced at the mold cavity side by way of a punching or cutting tool, that is to say in such a way that, at the mold cavity side, a wall of one of the shell-like intermediate products is pierced by the punching or cutting tool. It is however alternatively also possible for the opening to be produced at the tool side by way of a punching or cutting tool.

If the wall of the intermediate product is opened at the tool side by way of a punching tool or by way of a tool for cutting out a circular shape, this has the advantage that no material blank is lost in the finished tank.

The above-described method steps are preferably performed in the stated sequence.

The method as described above may also comprise the joining of other insert components to the shell-like intermediate products which are still in the warm plastic state, wherein the joining of said insert components may be performed substantially at the same time as the joining of the first attachment element.

The invention is to be understood as encompassing a situation in which at least one first attachment element may be provided on at least one shell-like intermediate product, though it is basically also possible for multiple first attachment elements to be provided at different locations of one or more shell-like intermediate products.

The method is however preferably not necessarily performed entirely utilizing the heat of extrusion of the plasticized thermoplastic material, wherein it is substantially preferable for no further plasticizing energy to be introduced into the extrudates. The method however does not rule out a situation in which parts of the extrusion blow-molding tool that is used, for example the edges of a possibly required tool divider or sealing frame or the edges of a so-called joining frame, are heated in order to prevent premature cooling of the parisons.

In the context of the present invention, a plug-type connection may for example be a plug-type connection comprising a socket end and a plug end, wherein the socket end and the plug end are preferably each equipped with mutually complementary detent means. The socket end may be formed by a correspondingly shaped attachment element, though the plug-type connection may, in the simplest case, comprise only one attachment nipple and one hose or pipe squeezed or crimped onto said attachment nipple. A plug-type connection of said type may for example have, on the plug end, one or more sealing elements in the form of O-rings.

In a preferred variant of the method according to the invention, it is provided that the first attachment element has a socket end and the second attachment element has a plug end, wherein the plug end is inserted from the outside into the socket end.

It may alternatively be provided that the first attachment element has a pot-shaped housing which is open at an end side and which has at least one attachment pin which is arranged in said housing and which is accessible from the open end side, wherein the housing is, by way of the open end side, welded at the mold cavity side to the wall of the shell-like intermediate product, in a manner encircling the opening. The pot-shaped housing in this case preferably forms a pot-shaped depression on the finished tank. In said pot-shaped housing, which is open at an end side, there may be provided at least one attachment pin, though said housing may also comprise multiple attachment pins. In the context of the present invention, an attachment pin is to be understood to mean a pin-like plug end with a plug-in profile.

In an advantageous and expedient variant of the method according to the invention, it is provided that the opening is formed into a region of the wall of the shell-like intermediate product, said region extending at an angle of greater than 0°, preferably approximately at right angles, to a plane of the shell-like intermediate product, which plane defines the greatest extent of the shell-like intermediate product, such that the plug-type connection can be produced parallel to a top or a bottom of the finished tank. In other words, the line leadthrough produced in this way in the wall of the finished tank extends approximately parallel to a top or a bottom of the tank, such that it is ensured that the tank takes up relatively little structural space in the installed position.

If, as first attachment element, use is made of a pot-shaped housing which is open at an end side and which has, arranged therein, an attachment which is accessible from the open end side, it is possible for a socket end to be used as second attachment element.

The punching-out of the opening is preferably performed by way of a mold-cavity-side punching tool which is pierced through the wall of the shell-like intermediate product into a tool-side die.

The die may for example initially be closed, by way of a tool-side piston, during the laying-in and molding of the shell-like intermediate product, wherein the die is opened by the piston, for the purposes of producing the opening, after the laying-in and molding. In this way, it can be ensured that, during the pre-blowing or molding and laying-in of the shell-like intermediate products, be it by negative pressure in the tool and/or positive pressure in the mold cavity, a smooth-walled outer contour of the shell-like intermediate product is initially produced.

The method according to the present invention is preferably performed using a blow-molding tool having in each case two mold halves which have in each case at least one recess, having at least one sealing frame and/or one joining frame, wherein the joining frame is movable transversely with respect to an opening and closing movement of the blow mold halves and can be placed between the blow mold halves, wherein the method comprises firstly the extrusion or provision of the parisons, with the parisons being arranged, during the former step or subsequently, between the open blow mold halves, the blow mold halves are closed against the sealing frame, the parisons are subsequently molded, using differential pressure, to form shell-like intermediate products, the opening is subsequently punched out or cut out in a circular shape, the blow mold halves are then opened, and at least the first attachment element is welded to the wall of an intermediate product, and finally the blow mold halves are closed directly against one another for the purposes of joining the shell-like intermediate products.

It is basically expedient and possible in the context of the present invention for the opening to be produced by way of a punching or cutting tool provided in the joining frame. In this case, the opening is punched, or cut out in a circular shape, only after the blow mold halves have been opened, the joining frame has been placed between the open blow mold halves, and said blow mold halves have been closed again against the joining frame.

In the method according to the invention, it is however preferable for at least one punching or cutting tool to be accommodated in the sealing frame, such that the opening can be produced immediately after the molding of the parisons to form shell-like intermediate products.

As already mentioned above, it is basically also possible, and within the scope of the invention, for the opening to be punched out or cut out in a circular shape at the tool immediately after the welding of the parisons to form the shell-like intermediate products.

In this context, joining is to be understood to mean the welding of the shell-like intermediate products at the edges with the application of joining pressure, wherein the shell-like intermediate products are in this case still in the warm plastic or hot plastic state.

The invention also encompasses a fuel tank which is distinguished by at least one line leadthrough through a tank wall, comprising a plug-type connection which is arranged within a shell surface or contour of the tank as defined by the tank wall. The fuel tank has preferably been produced in accordance with the method described above.

In a variant of the fuel tank according to the invention, it is provided that the plug-type connection comprises a first attachment element and a second attachment element, and that the first attachment element is welded to the tank, and that the second attachment element is connected in positively locking fashion to the first attachment element.

The first attachment element is preferably in the form of a socket end of the plug-type connection.

Alternatively, the first attachment element may have a pot-shaped housing which is open at an end side and in which there is arranged an integrally formed attachment pin, wherein the housing defines a volume which detracts from the tank volume.

Figure 2B:
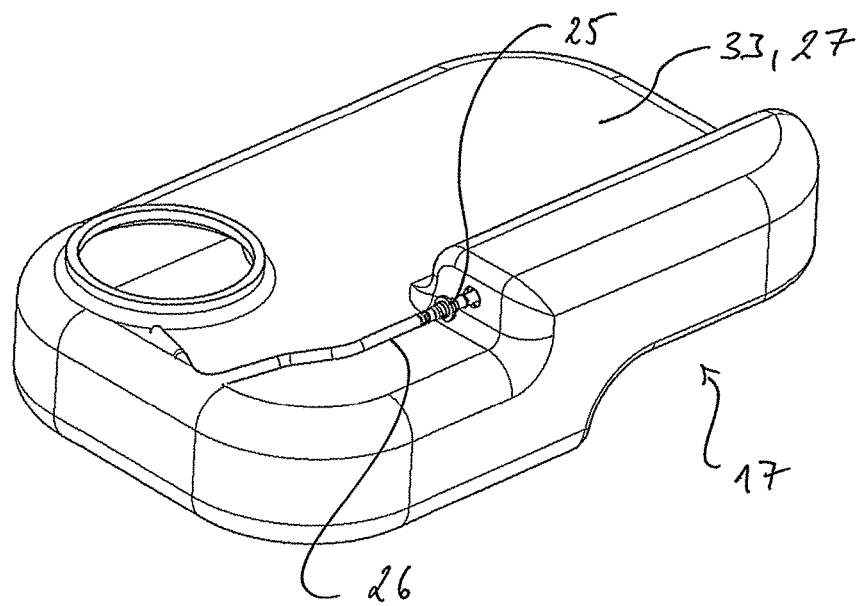
Figure 3:
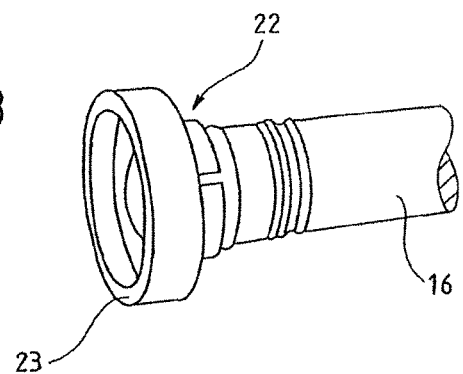
Figure 4:
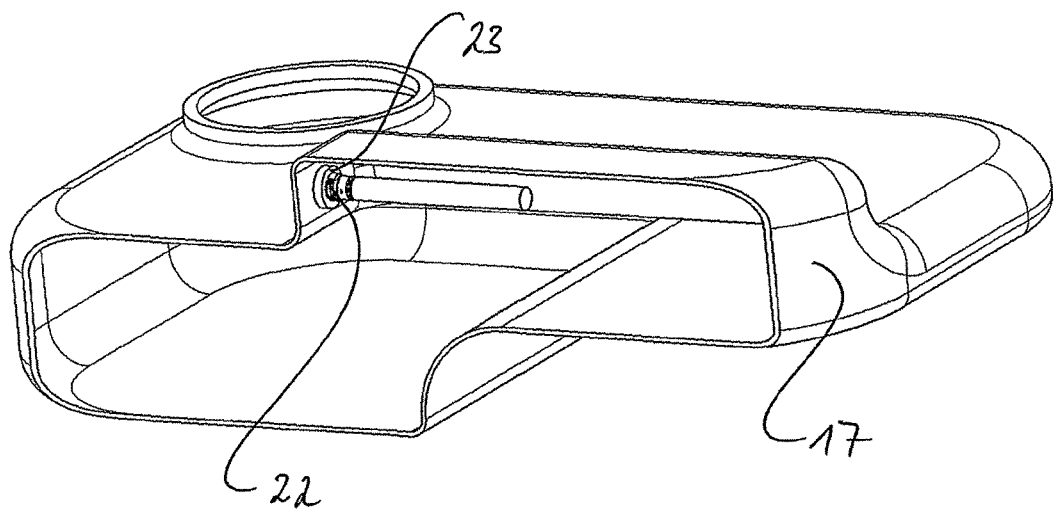
Figure 5:
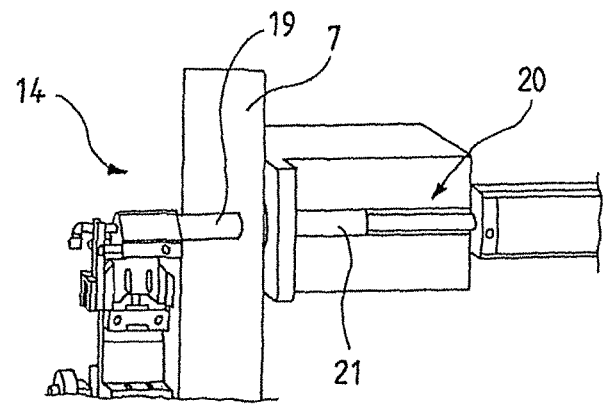
Figure 6:
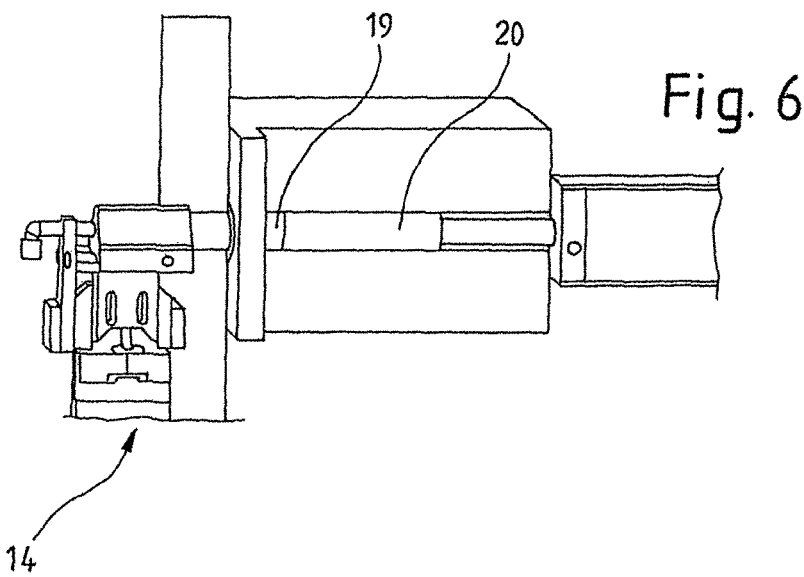
Figure 7:
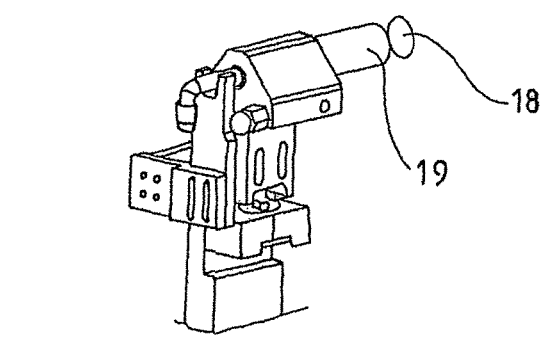
Figure 8:
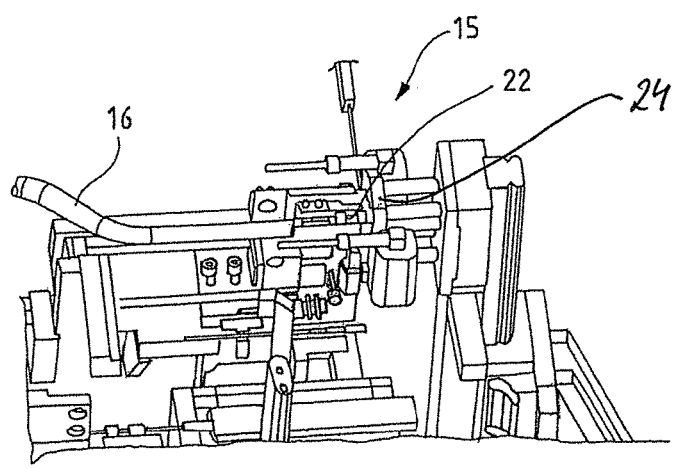
Figure 9:
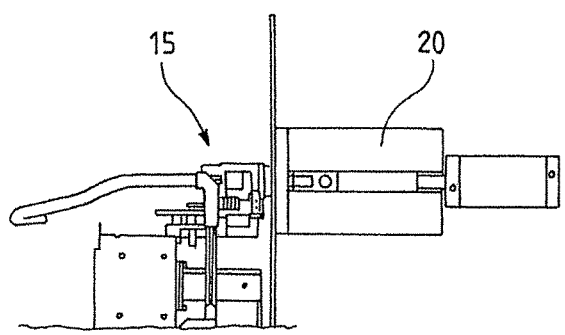
Figure 10:
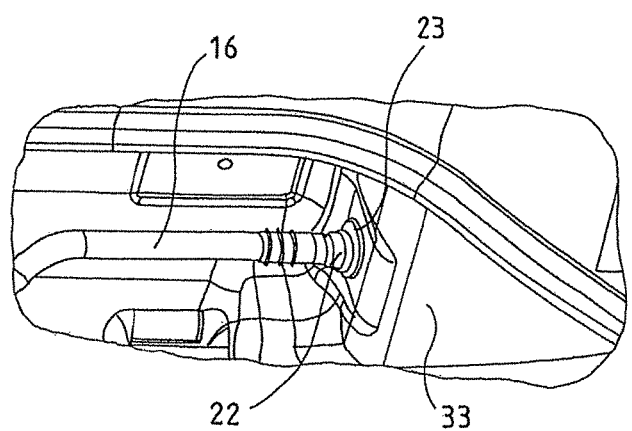
Figure 11:
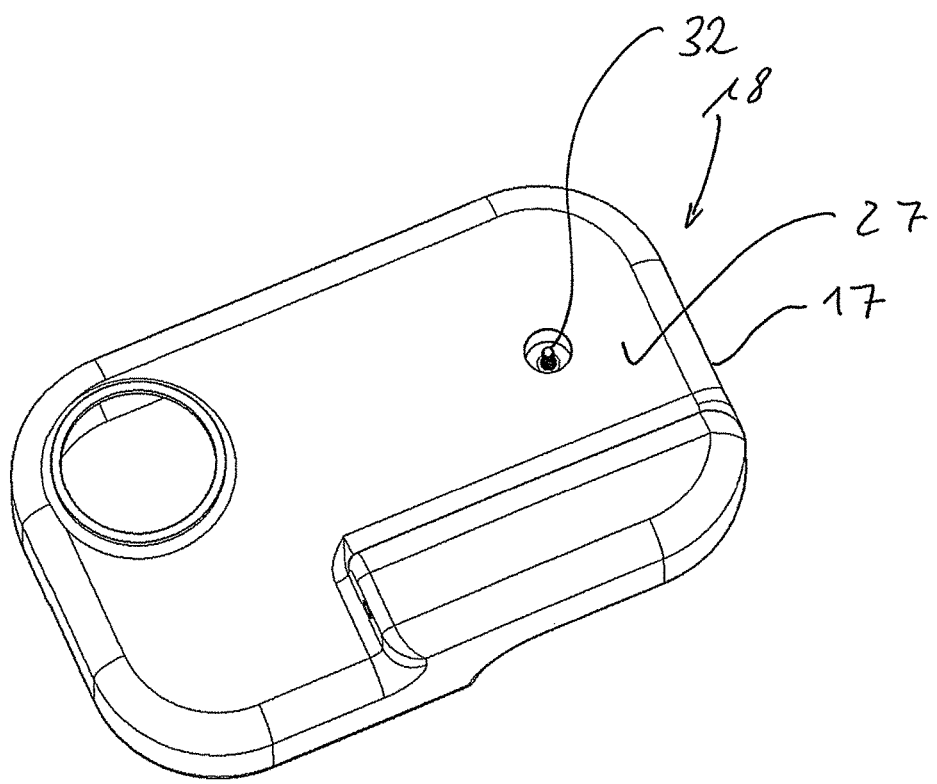
Figure 12:
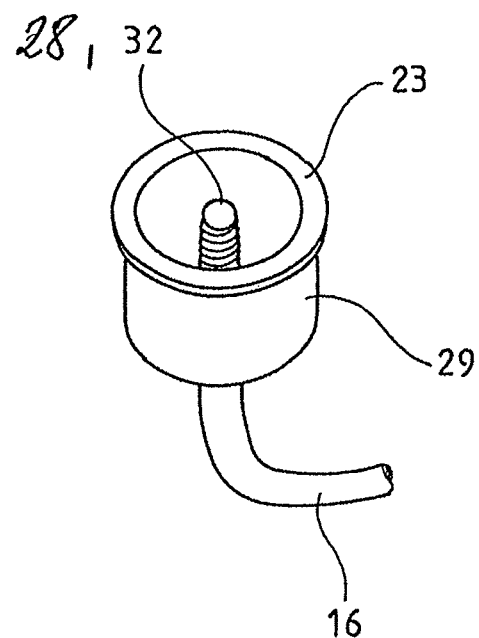
Figure 13:
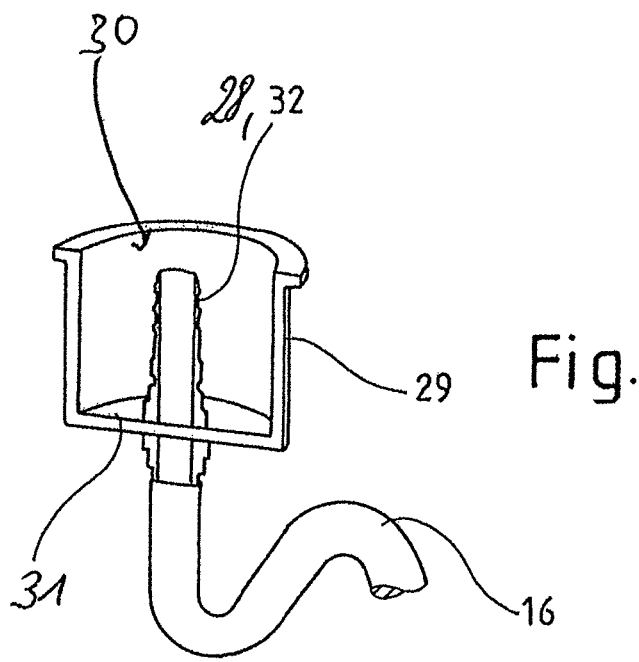

The invention will be discussed below on the basis of an exemplary embodiment illustrated in the drawings, in which:

FIGS. 1A to 1C are a schematic illustration of the manufacturing cycle for the production of the tank according to the invention, FIGS. 2a and 2b each show a perspective view of a first variant of the tank according to the invention, FIG. 3 shows a perspective view of the first attachment element according to the first exemplary embodiment of the tank according to the invention, FIG. 4 shows an enlarged partial view of the tank illustrated in FIG. 2a, partially in section, from which the position of the first attachment element in the tank can be seen, FIG. 5 shows a perspective view of a punching unit arranged on the mold cavity, which punching unit is used in the method according to the invention, directly before the punching of the opening, FIG. 6 shows a view corresponding to FIG. 5, during the punching of the opening, FIG. 7 shows a perspective view of the punching device after the punching of the opening, wherein, for the sake of simplicity, the blow-molding tool is not illustrated, FIG. 8 shows a perspective view of a welding device which is provided on the mold cavity and which serves for the joining and welding of the first attachment element, FIG. 9 shows a side view of the welding device during the welding of the first attachment element, FIG. 10 shows an internal view of the tank with the fully installed attachment element, FIG. 11 shows a perspective view of a tank according to a second variant of the invention, FIG. 12 shows a perspective view of a first attachment element according to a second variant of the invention, and FIG. 13 shows a sectional view through the attachment element illustrated in FIG. 12.

Reference is made firstly to FIGS. 1a to 1c, which show a schematic view of a blow-molding tool 1 and of an extrusion head 2 for carrying out the method according to the invention. The blow-molding tool comprises two blow mold halves 3 which are fastened to mold clamping plates and which are movable away from one another and toward one another in an opening and closing movement. Even though the expression "blow mold halves" has been used here, it falls within the invention for the individual blow mold halves 3, which each have a recess 5, to be of multi-part form. Each of the blow mold halves 3 need not necessarily form half of the blow-molding tool. Also, the parting planes of the blow mold halves need not necessarily form a geometrically halved division of the blow-molding tool.

In the exemplary embodiment illustrated, the mold clamping plates 4 are part of a machine base frame which is not shown in any more detail.

The extrusion head 2 is illustrated in highly simplified form in the drawings, and comprises two wide-slot nozzles, from which in each case sheet-like or web-like parisons 7 which extend rectilinearly into the plane of the drawing are extruded in continuous fashion in a hanging manner, that is to say in the direction of gravitational force. The parisons 7 are preferably composed in each case of an altogether six-layer extrudate comprising a carbon-black-pigmented HPDE layer, a recyclate (regrind) layer based on HDPE, an EVOH barrier layer surrounded on both sides by an adhesion promoter, and a further, non-pigmented HDPE layer. The adhesion promoter layers may for example be based on LDPE.

The blow-molding tool 1 according to the invention comprises not only the machine base frame (not illustrated) but also a machine frame 8 which is movable relative to the machine base frame and transversely with respect to the opening and closing movement of the mold clamping plates 4. A sealing frame 9 and a joining frame 10 are arranged on the machine frame 8 so as to be spaced apart from one another. The sealing frame is equipped with encircling sealing surfaces 11 which define an encircling contour which approximately follows the delimitation of the recesses 5 of the blow mold halves 3.

The joining frame 10 is likewise in the form of a central frame, within which there are arranged individual component receptacles 12 in the form of pneumatic piston-cylinder arrangements with fastening means.

It is basically possible for the structural depth of the sealing frame 9 and that of the joining frame 10 to be approximately equal. The sealing frame 9 may, in the simplest case, be in the form of a simple plate, possibly with means for the pressurization of the recesses 5 with gas. In the variant of the blow-molding tool 1 illustrated in the present exemplary embodiment, the sealing frame 9 accommodates a punching unit 14. A punching unit of said type may additionally or alternatively also be arranged in the joining frame 10.

In the case of the illustrated embodiment, the machine frame 8 with the sealing frame 9 and joining frame 10 arranged thereon is movable relative to the extrusion head 2. Provision may alternatively be made for the sealing frame 9 and the joining frame 10 to be arranged on the machine frame 8 so as to be movable relative to one another. It is likewise possible in the context of the invention for the machine frame 8 to be arranged on the machine frame so as to be movable relative to the extrusion head 2, and for the joining frame 10 and the sealing frame 9 to be arranged on the machine frame so as to be movable relative to one another. Finally, provision may also be made for the machine frame 8 to be arranged positionally fixed relative to the extrusion head 2, and for the blow mold halves 3 to be moved relative to the sealing and joining frames which are arranged positionally fixedly on the machine frame 8.

FIGS. 1A and 1B show the blow-molding tool 1 at the end and at the start of each working cycle. A working cycle of said type comprises initially the extrusion of the parisons continuously to a length which corresponds approximately to the height of the blow mold halves 3, as illustrated in FIG. 1c. The parisons 7 are extruded between the open blow mold halves, specifically in each case between a blow mold half 3 and the sealing frame 9 arranged between the blow mold halves 3. In a further method step which is not illustrated, the blow mold halves close against the sealing frame 9 arranged between them, the parisons 7 are then cut off at the extrusion head 2, specifically with the aid of further tools for cutting the continuously extruded parison. For the sake of simplicity, said tools are not illustrated. Then, the parisons 7 are laid in the recesses 5 of the blow mold halves 3, and molded, using vacuum and/or positive pressure.

In a further method step, by way of the punching unit 14 arranged in the sealing frame 9, an opening 18 is punched in the parison 7 that has been molded to form a shell-like intermediate product. Here, by way of the punching unit 14, the opening 18 is punched out of the parison 7, which has been molded in the respective recess 5 to form a shell-like intermediate product, by way of a punching sleeve 19, wherein a punching sleeve 19 is pushed into a correspondingly shaped die 20 within the recess 5 of the blow-molding tool 1. In the die 20 there is arranged a piston 21 which is preferably subjected to a pneumatic pressure preload and which closes the die 20 and which is displaced by the punching sleeve 19. The piston 21 serves for holding the die 20 closed during the molding of the parisons 7 to form shell-like intermediate products while the blow mold halves are closed against the sealing frame 9, in order to thereby ensure that the tool-side surface of the shell-like intermediate product is not deformed into the die 20.

The blow mold halves 3 are opened, then the joining frame 10 is placed between the open blow mold halves 3. This may be realized either by virtue of the machine base frame (not shown) being moved relative to the positionally fixedly arranged extrusion head 2 or by virtue of the machine frame 8 being moved relative to the blow-molding tool 1, which is arranged positionally fixedly under the extrusion head 2.

In the joining frame 10 there are provided component receptacles 12 with insert components 13 which are intended to be arranged in the interior of the tank to be manufactured.

In this method step, in the open recesses 5 of the blow-molding tool, the shell-like intermediate products are molded whilst still in the hot plastic or warm plastic state.

In the following method step, the insert components 13 are, utilizing the plasticization heat that is still present, joined to the shell-like intermediate products which are still in the warm plastic state, wherein the joining may be performed either cohesively and/or in positively locking fashion. In this context, cohesive joining encompasses the welding of the insert components 13 to the mold-cavity-side wall of the respective shell-like intermediate product.

In the context of the present application, a mold cavity is to be understood to mean the space enclosed by the recesses 5 of the blow mold halves 3. In the context of the present application, the expression "mold cavity side" refers to that side of the parison or of the shell-like intermediate product which is averted from the respective recess.

For the purposes of joining the insert components in the context of welding these to the wall, which is still in the warm plastic or hot plastic state, of the shell-like intermediate product, the joining frame 10 comprises at least one welding unit 15. The welding unit 15 may have infrared heat radiators or welding mirrors or heating plates of some other design. The insert component 13 to be joined is softened and or heated at the welding surface provided for this purpose, for example by way of IR radiators or welding mirrors, and is then pressed, for example actively by way of the component receptacles 12, against the shell-like intermediate product.

Above, the possibility of providing the component receptacles 12 in the form of pneumatic piston-cylinder arrangements was mentioned; in this case, the insert components 13 are actively joined in the sense that they are moved by way of the component receptacles 12 in the direction of the shell-like intermediate product.

It is alternatively possible and expedient for the component receptacles 12 to be in the form of simple plug receptacles which merely hold and fix the respective insert components 13, with the actual joining process then being realized by way of the closure of the blow mold halves 3 against the joining frame 10 (static joining).

The exemplary embodiment on which the application is based is described with reference to a fuel tank for motor vehicles, in which, for example, the ventilation valves are installed as insert components. The ventilation valves are connected to one another by way of a ventilation line 16; this arrangement is also referred to generally as a so-called spider of lines. To be able to attach the ventilation line 16 to the outside of the fuel tank 17 to be produced, it is necessary for a line leadthrough or opening 18 to be provided in the wall of the fuel tank 17 as the article/tank to be manufactured. As mentioned above, said opening 18 is produced immediately after the molding of the parisons 7 to form shell-like intermediate products, specifically by way of the punching unit 14 arranged in the sealing frame 9. The punching unit 14 is illustrated in FIGS. 5 to 7.

After the closure of the blow-molding tool or of the blow mold halves against the joining frame 10, the welding of an attachment end of the ventilation line 16 to the shell-like intermediate product is realized by way of the welding unit 15, illustrated in FIG. 8, in the region of the opening 18, such that the attachment end of the ventilation line communicates with the opening 18.

At the same time, the welding of the other insert components, for example in the form of the ventilation valves which are connected via the ventilation line 16, is performed. For the purposes of attachment to the parison 7 in the region of the opening 18, the ventilation line 16 is connected to a first attachment element in the form of a welding sleeve 22. The welding sleeve 22 on the ventilation line 16 is illustrated in FIGS. 3 and 10.

As can be seen in particular from FIG. 8, the ventilation line is inserted with its open end and the welding sleeve 22 into the welding unit and, there, is initially placed by way of a welding collar 23 against a heating element 24. When the welding collar, which for example has a material compatible with the parison 7 in terms of weldability, has softened to an adequate extent, the welding sleeve 22 is pressed against the parison 7 or against the shell-like intermediate product that has already previously been molded at this stage of the process, such that the welding sleeve 22 is welded, at the edge of the opening 18, to the parison 7.

Even though the description above refers firstly to the punching of the opening 18 and then the welding, it is expedient and possible in the context of the invention for the insertion of the ventilation line 16 into an article receptacle of the welding unit, and the softening of the welding collar 23, to be performed outside the blow-molding tool immediately before the joining frame 10 is placed between the blow mold halves 3.

FIG. 9 illustrates the process of the joining and welding of the welding sleeve 22 to the wall of the fuel tank 17 within the blow-molding tool 1, wherein the welding sleeve 22 has already been pre-mounted on the ventilation line 16.

FIG. 10 illustrates the completed attachment of the welding sleeve 22 to the wall of the fuel tank 17.

After the joining of the insert components 13 and in particular the attachment of the ventilation line 16 to the opening 18, the blow mold halves 3 are opened, the joining frame 10 is moved out of the closing path of the blow mold halves 3, and the latter are closed against one another, wherein the shell-like intermediate products are joined to form the substantially finished fuel tank 13. The joining is performed in a known manner by way of welding of the shell-like intermediate products or of the parisons 7 at the edges.

Then, the blow mold halves 3 are opened again, and the article in the form of a finished fuel tank 17 is removed.

After said fuel tank has possibly been trimmed, a second attachment element 25 of an external line section 26 is inserted through the outwardly exposed opening 18.

As can be seen from FIGS. 2a and 2b, which show the fuel tank 17 in perspective external views, the opening 18 on the finished fuel tank 17 is arranged so as to extend approximately perpendicular to a top 27 of the fuel tank 17, such that the external line section 26 can be laid parallel to the top 27 without a line bend and substantially without an angle piece.

The plug-type connection can, owing to the configuration described above, be produced within the volume of the fuel tank 17. An alternative embodiment of the fuel tank 17 and of the second attachment element is illustrated in FIGS. 11 to 13. FIG. 12 shows the first attachment element as a plug connector 28 or as a plug end. Said plug connector 28 comprises a cup-like or bowl-like or pot-shaped housing 29, which has an end-side opening 30 and a base 31. Integrally formed on the housing 29 is an attachment pin 32, in the form of a double nipple, which extends through said housing. The attachment pin 32 comprises a plug end which is surrounded by the housing 29, and a plug end which is situated in the interior of the tank in the installed position and onto which the ventilation line 16 is plugged in the interior of the tank. Finally, the opening 30 of the housing 29 is surrounded by a welding collar 23 which, in the above-described manner, is welded to the parison 7 or to the shell-like intermediate product, so as to border or enclose the opening 18, during the production of the fuel tank 17, wherein the housing 29 is situated entirely in the interior of the tank, such that the free plug end of the attachment pin 32 is, as can be seen in FIG. 11, arranged in recessed fashion within the tank contour, such that, in this variant of the fuel tank 17, too, a second attachment element can be connected from the outside to the attachment pin 32 such that the plug-type connection extends within the contour of the fuel tank 17 as defined by the tank wall 33. In this case, the external line section 26 may be plugged either by way of a socket end or else directly onto the attachment pin 32, wherein the attachment direction is approximately normal to the extent of the top 27.

In the exemplary embodiment shown in FIG. 11, the welding collar 23 of the housing 29 extends approximately parallel to the top 27 of the fuel tank 17, but the invention is to be understood as also including a situation in which installation at an angle to the direction of extent of the top 27 is possible, for example perpendicular thereto, such that the external line section 26 can be plugged in or connected approximately parallel to the direction of extent of the top 27 of the fuel tank 17.

In the context of the invention, a plug-type connection is also to be understood to mean a plug-type connection which is or can be produced by way of a detent action.

LIST OF REFERENCE NUMERALS

1 Blow-molding tool
2 Extrusion head
3 Blow mold halves
4 Mold clamping plate
5 Recesses
6 Wide-slot nozzles
7 Parisons
8 Machine frame
9 Sealing frame
10 Joining frame
11 Sealing surfaces
12 Component receptacles
13 Insert components
14 Punching unit
15 Welding unit
16 Ventilation line
17 Fuel tank
18 Opening
19 Punching sleeve
20 Die
21 Piston
22 Welding sleeve
23 Welding collar
24 Heating element
25 Second attachment element
26 External line section
27 Top
28 Plug connector
29 Housing
30 Opening
31 Base
32 Attachment pin
33 Tank wall

What is claimed is:

1. A method for producing a tank from thermoplastic material, comprising:
    forming a plurality of parisons of thermoplastic material,
    laying-in and molding the parisons in recesses of a multi-part blow-molding tool using differential pressure to form a corresponding plurality of shell-like intermediate products, wherein the recesses of the blow-molding tool delimit a mold cavity,
    punching out or cutting out at least one opening in at least one of the shell-like intermediate products, wherein the opening is produced by a mold-cavity-side punching or cutting tool which penetrates through a wall of the shell-like intermediate product into a tool-side die, wherein the die is closed by a tool-side piston during the laying-in and molding of the parisons, and the die is opened by the piston for producing the opening after the laying-in and molding of the parisons,
    welding a first attachment element of a line connection or a line arrangement, at the mold cavity side, to the wall of the shell-like intermediate product, such that an encircling weld collar of the first attachment element sealingly surrounds the opening, wherein the first attachment element does not pierce or extend through the wall of the intermediate product,
    joining the shell-like intermediate products to form a tank, and removing the tank from the blow-molding tool, and
    connecting a second attachment element, which is complementary to the first attachment element for a plug-type connection, to the first attachment element.

2. The method as claimed in claim 1, wherein the first attachment element has a socket end and the second attachment element has a plug end, wherein the plug end is inserted into the socket end.

3. The method as claimed in claim 1, wherein the first attachment element has a pot-shaped housing which is open at an end side and which has at least one attachment pin which is arranged in said housing and which is accessible from the open end side, wherein the housing is, by the open end side, welded at the mold cavity side to the wall of the shell-like intermediate product, in a manner encircling the opening.

4. The method as claimed in claim 1, wherein the opening is formed into a region of the wall of the intermediate product, said region extending at an angle of greater than 0° to a plane of the shell-like intermediate product, which plane defines the greatest extent of the shell-like intermediate product, such that the plug-type connection can be produced parallel to a top or a bottom of the tank.

5. The method as claimed in claim 1, wherein the blow-molding tool comprises two blow mold halves which each have at least one of the recesses, at least one sealing frame and/or one joining frame which is/are movable transversely with respect to an opening and closing movement of the blow mold halves and which is/are locatable between the blow mold halves.

6. The method as claimed in claim 5, wherein the opening is produced by way of the punching or cutting tool arranged in the sealing frame.

7. The fuel tank as claimed in claim 4, wherein the angle of greater than 0° is approximately 90°.

8. The method as claimed in claim 5, further comprising arranging the blow mold halves in an open position, positioning the plurality of parisons of thermoplastic material and the sealing frame between the open blow mold halves, and thereafter closing the blow mold halves against the sealing frame prior to the laying-in and molding of the parisons in the recesses of the blow-molding tool using differential pressure.

9. The method as claimed in claim 8, wherein the punching out or cutting out of at least one opening is performed while the blow mold halves are closed against the sealing frame, and with the punching or cutting tool provided with the sealing frame.

10. The method as claimed in claim 9, further comprising opening the blow mold halves after the punching out or cutting out of the at least one opening, and thereafter removing the sealing frame from between the open blow mold halves.

11. The method as claimed in claim 10, further comprising positioning the joining frame between the open blow mold halves after the removing of the sealing frame from between the open blow mold halves, and thereafter closing the blow mold halves against the joining frame.

12. The method as claimed in claim 11, wherein the welding of the first attachment element of the line connection or the line arrangement is performed while the blow mold halves are closed against the joining frame.

13. The method as claimed in claim 12, further comprising opening the blow mold halves after the welding of the first attachment element of the line connection or the line arrangement, and thereafter removing the joining frame from between the open mold halves.

14. The method as claimed in claim 13, further comprising closing the blow mold halves towards each other to facilitate the joining of the shell-like intermediate products to form a tank.

15. The method as claimed in claim 1, wherein the forming of the plurality of parisons further comprises forming each of the plurality of parisons by extruding each of the plurality of parisons.

16. The method as claimed in claim 1, wherein the forming of the plurality of parisons further comprises forming each of the plurality of parisons in a web form.

17. The method as claimed in claim 1, wherein the forming of the plurality of parisons further comprises forming each of the plurality of parisons in a sheet form.

18. The method as claimed in claim 1, wherein the forming of the plurality of parisons further comprises forming the plurality of parisons from an extrudate.

19. The method as claimed in claim 18, wherein the forming of the plurality of parisons from the extrudate further comprises forming the plurality of parisons from the extrudate by dividing the extrudate into the plurality of parisons.

20. The method as claimed in claim 1, wherein the at least one opening has a circular shape.

* * * * *